Jan. 12, 1926.
H. B. KLINE
1,568,978
AUXILIARY BANKING MEANS
Filed April 22, 1922   2 Sheets-Sheet 1
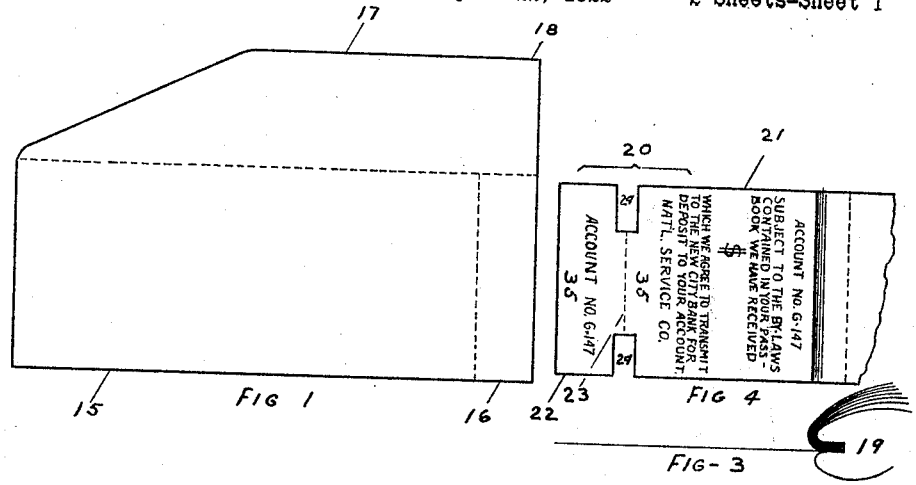
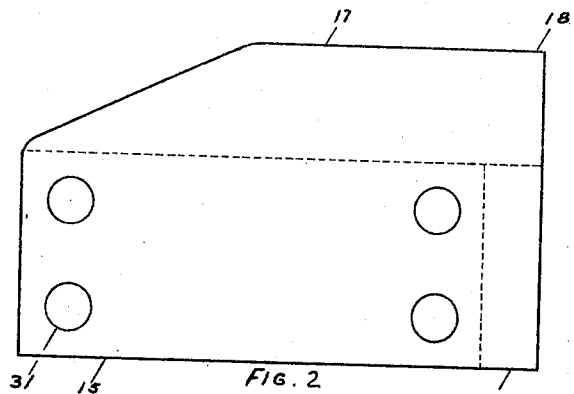
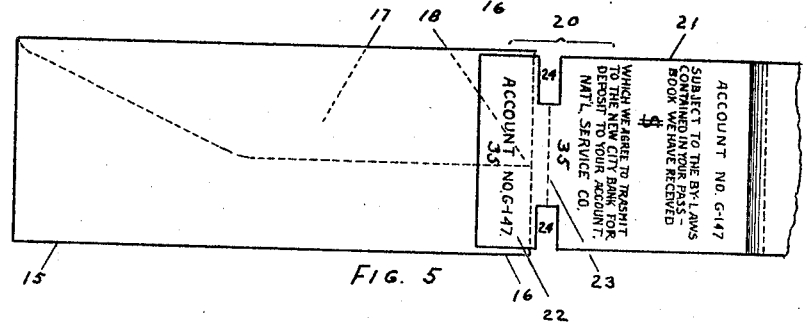
Inventor
HAROLD B. KLINE.
By Martin & Rendell
Attorneys Jan. 12, 1926.

H. B. KLINE 1,568,978

AUXILIARY BANKING MEANS

Filed April 22, 1922   2 Sheets-Sheet 2

Inventor
HAROLD B. KLINE.

By Martin & Rendell
Attorneys

Patented Jan. 12, 1926.

1,568,978

UNITED STATES PATENT OFFICE.

HAROLD B. KLINE, OF UTICA, NEW YORK, ASSIGNOR TO NATIONAL AUTOMATIC TELLER CORPORATION, OF UTICA, NEW YORK, A CORPORATION.

AUXILIARY BANKING MEANS.

Application filed April 22, 1922. Serial No. 555,991.

*To all whom it may concern:*

Be it known that I, HAROLD B. KLINE, a citizen of the United States, and a resident of Utica, in the county of Oneida and State of New York, have invented certain new and useful Improvements in Auxiliary Banking Means; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to auxiliary banking means used with money-deposit-receiving machines and relates especially to the envelope and coupon to hold the money and to identify the deposit and supply the receipt in such transactions.

The purpose of this invention is to provide such means especially adapted for use with machines that receive deposits of money where the machine fastens an identifying coupon to the money envelope and also where the machine impresses a receipt upon a coupon presented by and retained by the depositor.

A further purpose is to provide such auxiliary banking means that are simple in construction and use, easily understood and handled by the depositor, well adapted to stand the strain of use, economical in cost, of wide use and well adapted to allow the machine to perform its functions with sureness, safety, convenience and definiteness.

A further purpose is to provide such auxiliary means that are well adapted to receive the money presented by the depositor and pass the same into the machine so as to provide means for securely holding the deposit intact until it is to be opened, and to provide means annexed to each envelope for readily and surely identifying the depositor of each envelope and to indicate the amount of the receipt given therefor, and to provide means for supplying the depositor with a receipt that is definite in amount and easily understood and readily kept by the depositor.

Another object is to provide means of the character described that allows the envelope to be provided economically and of one standard form no matter where or by whom used and without danger of confusion or loss of deposits.

A further purpose is to provide such identifying means that each depositor has his own supply of coupons to identify his individual deposits and also a supply of coupons to be severally made into receipts when presented with a deposit to the machine.

Another purpose is to provide a stock deposit envelope well adapted for making regular deposits after the first deposit and which envelope may be easily modified to adapt it to be used for the first deposit or when the depositor does not have a supply of identifying coupons or receipt forms.

A further purpose is to provide auxiliary banking means especially adapted for use with the deposit receiving machine invented by me and for which I am applying for United States Letters Patent by an application verified by me on the nineteenth day of April 1922.

Further purposes and advantages of my invention will appear from the detailed specification hereof and the claims hereinafter set forth.

Fig. 1 is a front view of an entirely transparent deposit-receiving envelope such as may be used in one embodiment of my invention.

Fig. 2 is a modification thereof consisting of an envelope having transparent windows therein of sufficient size, number and of such location as to reveal the denomination of any bank bill placed in the envelope.

Fig. 3 is an edge view of a deposit book embodying several features of my invention, one page being shown extended alone preparatory to being applied to the deposit envelope.

Fig. 4 is a front view of the same book, showing one of the two-coupon or double coupon pages extended as in Fig. 3.

Fig. 5 shows the envelope of Fig. 1 and the deposit books of Figs. 3 and 4, brought together to the overlapping position in which they are presented for use in the deposit-receiving machine.

Figure 6:
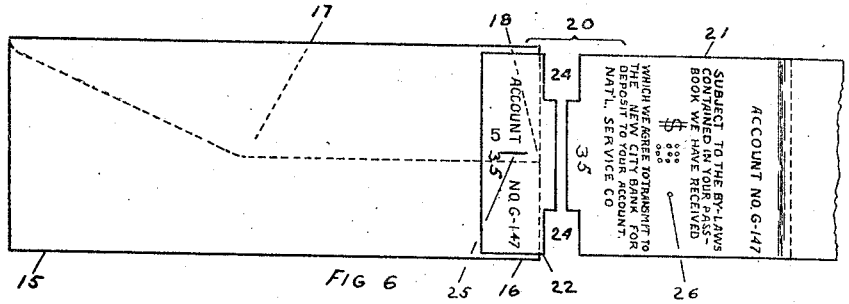

Fig. 6 is a front view of the same parts after the machine has fastened to the envelope the outer or identifying coupon and has impressed upon the inner coupon the character to complete the receipt formed thereon, the two parts of the page are shown severed to indicate the severing of said double coupon page by the said machine, the outer coupon also having impressed thereon a character to denote the amount of the receipt.

Figure 7:
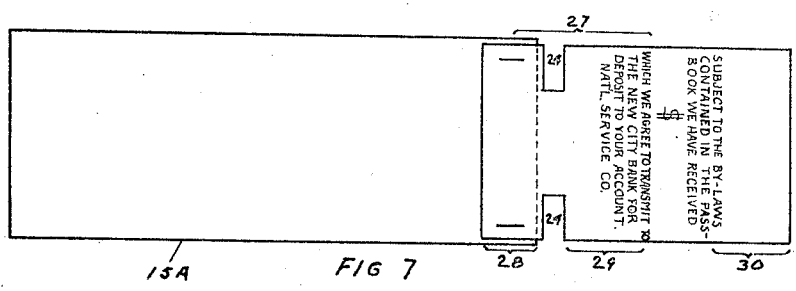

Fig. 7 is a front view of the deposit-receiving envelope modified to adapt it for an initial deposit or a deposit where the depositor has no deposit book of coupons, said modification consisting of affixing to the envelope a long tab which forms a handle for inserting the envelope into the machine and for removing from the machine the receipt that has been impressed upon the intermediate portion of said long tab.

Figure 8:
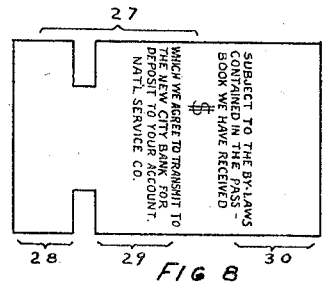

Fig. 8 is a plan view of said tab separately.

Figure 9:
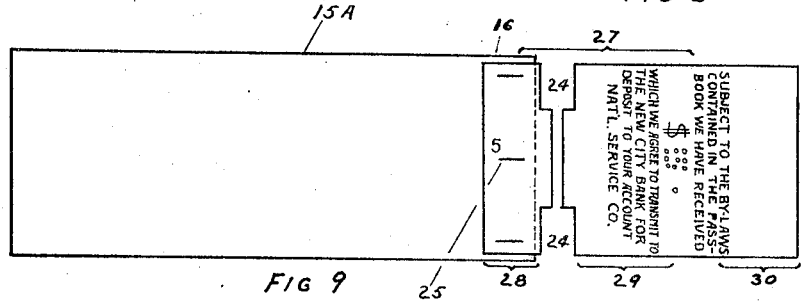

Fig. 9 is a plan view of the said initial deposit envelope after the inner part of the tab has been further fastened to the envelope and the envelope flap and severed from the receipted portion, the part remaining with the envelope also having had impressed thereon a character to denote the amount of the deposit receipted for.

Referring to the drawings in a more particular description it will be seen that the envelope 15 of Fig. 1 is formed of such size as to receive flat therein an unfolded bank bill and is formed of transparent paper or other transparent suitable material, of such transparency that any bank bill placed in the envelope is revealed distinctly enough to have its denomination readily seen.

The envelope 15 is formed with an extension or tab 16 at one end which tab or extension cannot be occupied by the money in the envelope. This may be done by pasting or otherwise fastening together the front and back of the envelope at that zone or by forming said extension as a single layer beyond the envelope proper.

The enevelope 15 is also formed along one of its long edges with the usual opening which is closed in the usual way by a flap 17 extending from the front of the envelope as seen in Fig. 1 and adapted to be sealed down against the back of the envelope in the usual way by the depositor after he has placed his money in said envelope.

At the end of the envelope opposite the tab 16 the flap is extended into line with that end of the envelope forming an enlargement 18 upon the flap which when the flap 17 is folded down upon the envelope, overlaps the tab 16 to a point say a little past its middle as indicated in Figs. 5 and 6.

The deposit book 19 comprises a plurality of pages or sheets 20 each in double coupon form or composed of two coupons, an inner coupon 21 and an outer coupon 22. All the coupon books or deposit books have an individual number or character indicating the identity of that book and this book-identifying character is repeated on both the inner and the outer coupons of each page. On the page of the deposit book shown in Figs. 4 and 5 the letters and numbers G-147 represent these book-identifying characters. It will be understood of course that the books are individually lettered or numbered in this way so that the bank upon issuing a deposit book may make a record of the number thereof as upon the depositor's original signature card and that thereby deposits coming back to the bank with deposit-identifying coupons of a given number are placed to the credit of the depositer having the bank book or deposit book of that number.

The outer coupon 22 is readily severable from the inner coupon as by being cut along the dotted line 23 by the deposit-receiving machine that this invention is intended to be used with. To allow of the use of a holder to hold the page of the deposit book in overlapping position relative to the envelope while the deposit envelope and coupon are being presented to the machine, the page adjacent each edge is cut away for some distance along the line of the dotted line 23, producing recesses 24. This allows the said holder to project some distance in from each long edge of the coupon and still allow of the two coupons of each page being readily severable by the machine by the use of severing jaws of less length than the width of the envelope 15 or body of either coupon 21 or 22.

In addition to the deposit book identifying number or really account number above mentioned each coupon of each page will preferably also have thereon similar or corresponding characters to indicate the separate coupons or deposits to be made by the book. In other words each page of a deposit book will have thereon a serial number as "1" for both coupons of the first page "2" for both coupons of the second page and so on through the entire book. This identification of the individual deposits and receipts coming from a given depositor affords a further check or safeguard for the use of the depositor and of the bank with which the deposit is made.

Upon the inner coupon of each page, that is the coupon which is to be temporarily inserted in the machine and then withdrawn by the depositor, there is printed the form of a receipt such for instance as the words "Subject to the by-laws contained in your pass book we have received $———— which we agree to transmit to the New City Bank for deposit to your account . . . National Service Co." When this coupon is placed in a deposit-receiving machine such as a machine shown in my co-pending application for patent upon deposit-receiving machine there will be impressed upon the receipt coupon in some form as by printing, embossing or perforation a character preferably the numeral indicating the amount of the deposit and preferably this added character will be so placed as to plainly complete the wording of the receipt as by placing the character 5 for instance after the printed sign $ in the receipt above outlined it will be obvious that the form of the receipt may be varied as circumstances require and of couse the name of the bank to which the money is to be sent will vary to accord with the facts. As is suggested by the form of the receipt above set forth the money received may be receipted for by a company which is not the bank but a company supplying or operating the machines and acting as the agent of the depositor to transmit the money to the bank.

Preferably the amount thus plainly stamped or impressed upon the receipt coupon will be also stamped or impressed upon the outer coupon 22 so as to indicate to the bank officials the amount that is supposed to be in the envelope and the amount for which a receipt has been given. The character impressed for this purpose upon the outer coupon may be the numeral corresponding to the receipt impression made upon the receipt such as the numeral 5 or it may be an entirely different number or letter the significance of which is known only to the bank officials and so not understood by the employee who may collect the deposit envelopes from the deposit-receiving machine.

As already intimated the outer coupon is intended to be inserted in the deposit-receiving machine in position to overlap the tab 16 projecting from the outer end of the envelope and when in the machine in this position the coupon 22 is securely fastened to the said tab. As the deposit operation is completed this coupon is severed from the inner coupon 21 and remains with the envelope as the means for identifying the owner of the deposit. In Fig. 6 the means for so fastening the outer coupon 22 to the envelope tab 16 is represented by the wire staple 25 affixed to said parts during the process of receiving the deposit but it will be understood that any other form of fastener that can be readily automatically applied by mechanism and that is relatively non-detachable will be satisfactory.

It will be noted, futhermore, that the fastener 25 also serves as an auxiliary fastening or sealing device of the envelope in that it fastens the enlarged portion 18 of the flap 17 to the back of the tab 16 and so prevents the envelope from being opened and the money removed therefrom without leaving plain evidence that the envelope has been opened.

In practice the coupon book or deposit book 19 will have in addition to the proper number of two coupon pages several pages such as are ordinarily found in a bank deposit book wherein the bank officials may make the usual entries of deposits from time to time. This is done by the bank officials after they have checked up the receipt coupons in the coupon book and compared them with their own record of deposits received. It will be seen that the means provided for receiving and identifying the deposit are such that if the amount of a deposit in an envelope varies from the stamped indication thereof also found on the envelope the bank official will be warned thereof before opening the envelope and this envelope can be laid aside to await the arrival of the depositor and show him for instance that the deposit receipt that he has for five dollars was obtained when he really deposited only two dollars and the unopened envelope sealed up by the depositor and still on hand is unanswerable evidence as to the real amount of the deposit.

In practice also there will preferably be added to the impression or perforation forming the numeral placed upon the receipt coupon an additional character to identify the particular machine where the deposit was made. Under certain circumstances it is a possible advantage to have the receipts presented show to the bank officials the machine that gave the receipt. Preferably also this identification of the individual machine is done in such a way as not to be noticeable to the depositor. As indicated upon Fig. 6 of the drawing this machine-identifying character may be simply an additional perforation as 26 placed near as below the punched numeral 5 on the receipted coupon. By varying the number and arrangement of these additional punch marks a system is readily worked out which will identify the machine that impressed the receipt upon the coupon.

Figs. 7–9 show a modification of the regular deposit-receiving envelope adapted for use by the depositor in making his initial deposit. At that time the depositor has no bank book or coupon book to identify the envelope presented by him, but the identification of the first envelope is effected by the depositor either writing his name upon the envelope or in practice by his writing his name and other desired information upon the deposit card usually signed by the depositor when opening a bank account and placing such deposit card in the envelope with his deposit. This forms a sufficient means of identifying the depositor and also enables the bank to prepare a deposit book for that depositor. In order, however, that the envelope may be used for this first deposit which is as near as possible to the stock envelope used for subsequent or regular deposits I provide an initial deposit envelope the envelope proper of which is the same as that used for the regular deposits. To this envelope, however, is securely affixed a long tab 27 shown in Fig. 9 which corresponds very closely with the shape and arrangement of the double coupon found in the deposit book above described. The part 28 of this tab corresponds to the shape of the outer coupon 22 but is permanently secured to the tab 16 on the end of the envelope 15ᴬ. The intermediate portion 29 of the long tab 27 corresponds to the receipt coupon 21 of the page of the deposit book and has printed thereon the wording of a receipt in blank which is completed when this initial deposit envelope is placed in the deposit-receiving machine by having impressed thereon the numeral corresponding to the amount of the deposit. The extra length and stiffness of the tab 27 enables its extreme right-hand portion as 30 to form a handle for placing the initial deposit envelope in the deposit-receiving machine in proper position and for withdrawing the receipt 29 after the deposit operation has been completed. As indicated in Fig. 9 this initial deposit envelope 15ᴬ will receive through its tab 16 and the portion 28 of its long tab 27 the usual staple 25 ordinarily used to fasten the outer coupon of a coupon book to the envelope. In the case of initial deposit envelope, however, this stapling is a surplus movement as far as fastening the portion 28 to the tab 16. The fastening operation, however, is still useful in that it has fastened the enlarged flap 18 to the tab 16 and the special tab 28 of this envelope to form the supplemental sealing means already described in connection with regular deposit envelopes. The long tab 27 is also shaped like the page from the coupon book in that it has the recess 24 on both upper and lower edge along the line where the deposit-receiving machine is to sever the two parts of this tab.

What I claim as new and desire to secure by Letters Patent is:

1. For use with a deposit-receiving machine an envelope to receive the money, said envelope having sufficient of the pocket portion thereof transparent to reveal the denomination of the money and having a long tab projecting from one end, the intermediate part of which is adapted to have impressed thereon a receipt and the outer end of which forms the handle for placing the envelope into the machine and for withdrawing the receipted part after it is severed by the machine from the envelope.

2. Auxiliary banking means for use with a machine for receiving deposits of money, consisting of an envelope to receive the money and carry the same into the machine, said envelope having a portion or tab not occupied by the money and adapted to have stapled thereto by the machine a coupon to identify the deposit, said envelope having a flap to be sealed by the depositor after the money is placed in the envelope, said flap also over-lapping the part of the envelope extension or tab to receive the staple whereby the said staple also fastens said flap down and prevents the envelope being opened without indicating such opening.

3. For use with a deposit receiving machine, an envelope of proper size to receive a bank bill, the pocket of said envelope having sufficient thereof transparent to reveal the denomination of the bill and said envelope having a long tab projecting from one end, the intermediate part of which is adapted to have impressed thereon a receipt and also adapted to receive from the machine an impression to indicate the individual machine giving the receipt and the outer end of which forms the handle for placing the envelope into the machine and for withdrawing the receipted part after it is severed by the machine from the envelope.

4. For use with a deposit-receiving machine, an envelope of proper size to receive a bank bill, said envelope having sufficient thereof transparent to reveal the denomination of the bill and having a long tab projecting from one end, the inner portion of which is adapted to receive an impression indicating the amount receipted for, the intermediate part of which is adapted to have impressed thereon a receipt and the outer end of which forms the handle for placing the envelope into the machine and for withdrawing the receipted part after it is severed by the machine from the envelope.

In witness whereof I have affixed my signature, this 19th day of April, 1922.

HAROLD B. KLINE.